Jan. 3, 1961    M. I. GOLDBERG    2,967,059
CONVERTIBLE STROLLER AND BABY CARRIAGE
Filed Jan. 2, 1959    3 Sheets-Sheet 3
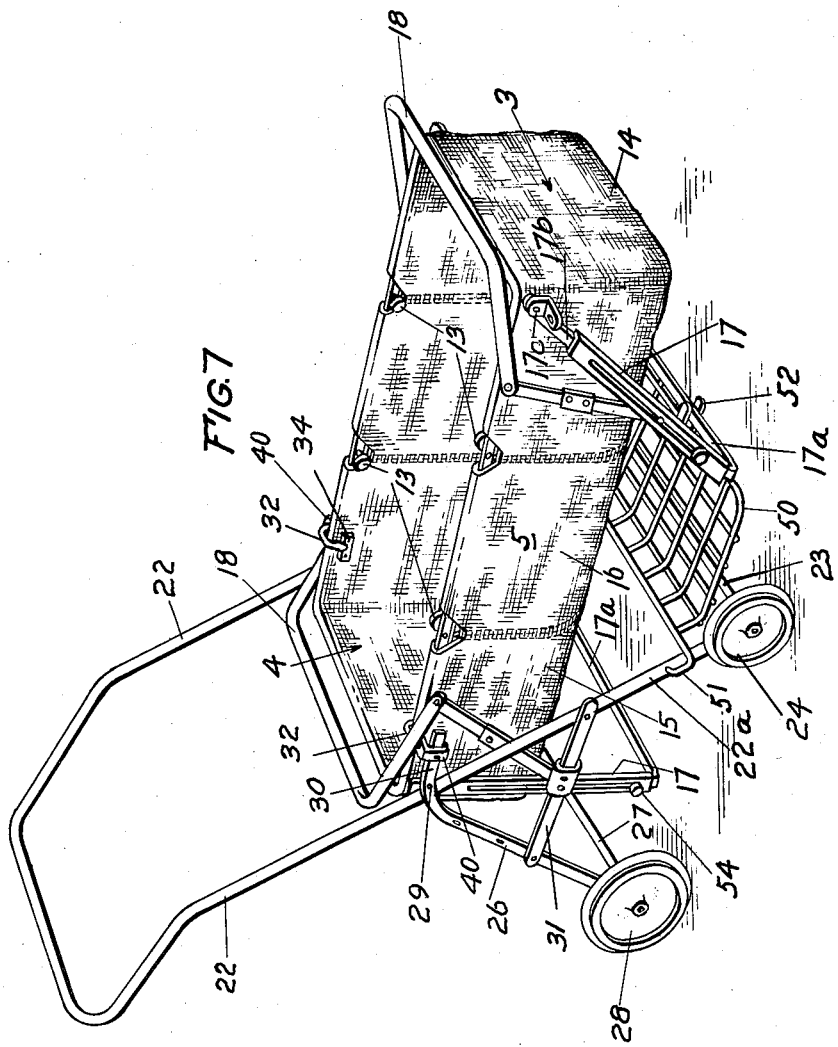
INVENTOR.
MORRIS I. GOLDBERG
BY Louis C. Smith
ATTORNEY.

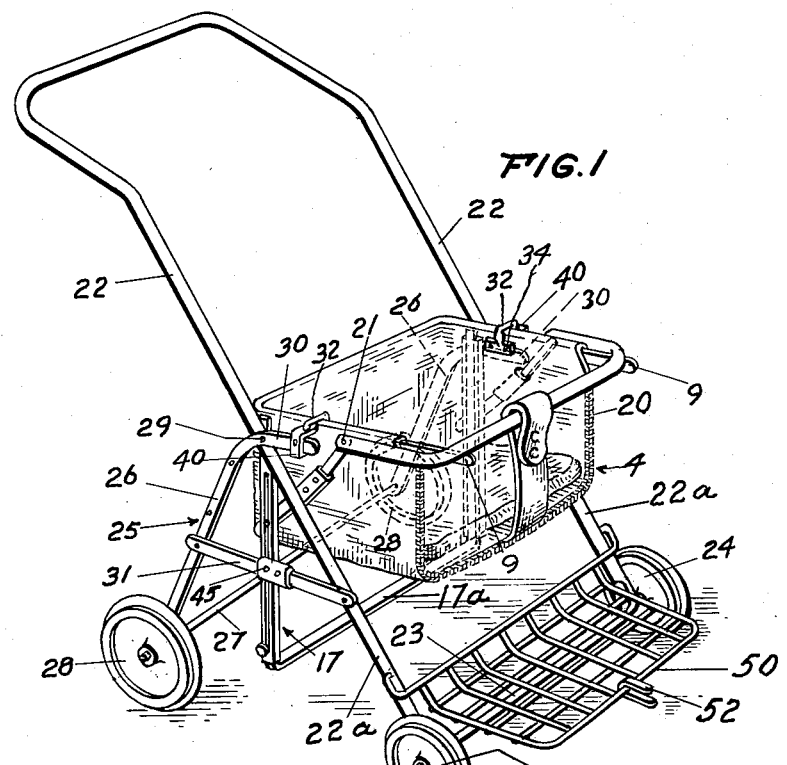
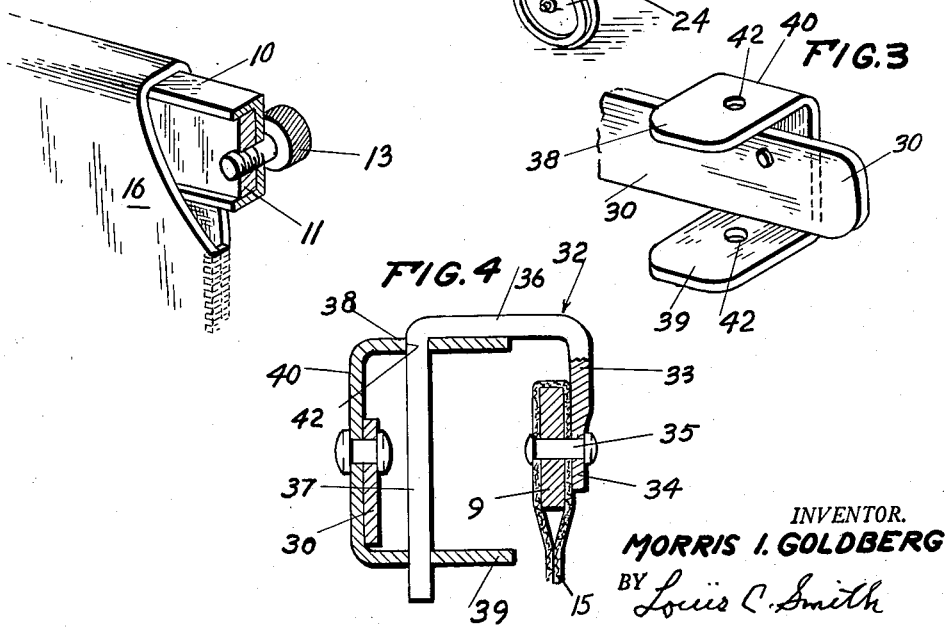

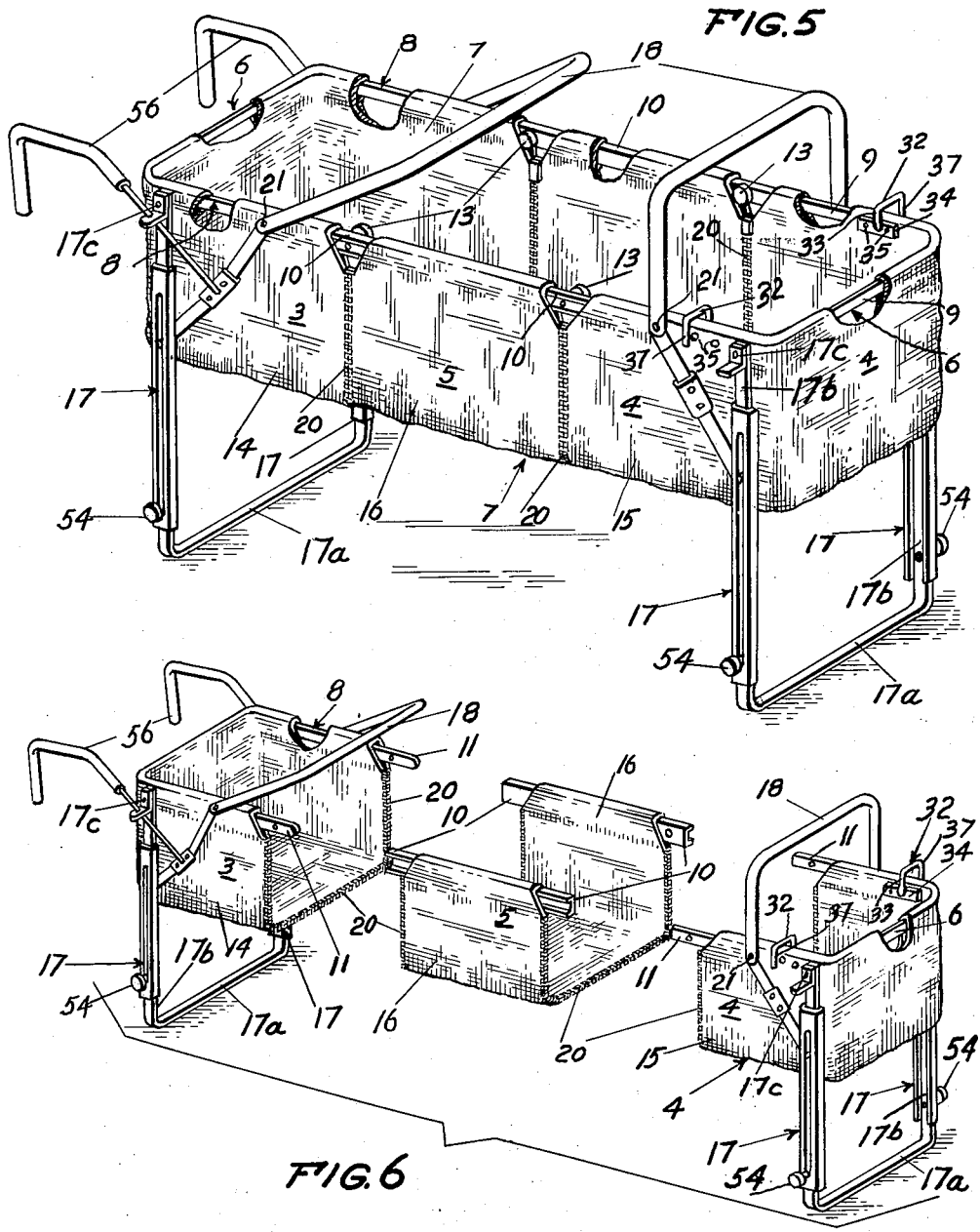

United States Patent Office 2,967,059
Patented Jan. 3, 1961

2,967,059

CONVERTIBLE STROLLER AND BABY CARRIAGE

Morris I. Goldberg, Waban, Mass. (% International Manufacturing Co., 2512 Washington St., Roxbury 19, Mass.)

Filed Jan. 2, 1959, Ser. No. 784,647

4 Claims. (Cl. 280—31)

This invention relates to a convertible stroller and baby carriage and which includes a vehicle frame and a bassinet which is divided transversely into three sections that include a head section, a foot section, and an intermediate section. One of the end sections, preferably the foot section, is provided with means by which it can be mounted on the vehicle frame. If such foot section of the bassinet is detached from the other sections and is mounted by itself on the vehicle frame, the vehicle will be converted into a stroller. If, however, said end section of the bassinet with the other sections secured thereto is mounted on the vehicle frame, said vehicle will be converted into a baby carriage.

The novel features of the invention will be apparent from the following description and will be pointed out in the appended claims.

In the drawings,

Fig. 1 is a perspective view of a vehicle embodying my invention when used as a stroller.

Fig. 2 is a sectional perspective view illustrating the manner in which the sections of the bassinet from which the seat portion of the stroller is taken are secured together.

Fig. 3 is a fragmentary perspective view of the seat-supporting portion of the vehicle frame.

Fig. 4 is an enlarged section on the line 4—4, Fig. 1.

Fig. 5 is a perspective view of a three-sectional bassinet, one of the end sections of which has the mounting means thereon and constitutes the seat for the stroller.

Fig. 6 is a perspective view showing the bassinet illustrated in Fig. 5 separated into its three sections.

Fig. 7 shows a vehicle embodying my invention when used as a baby carriage.

Referring first to Figs. 5 and 6, Fig. 5 shows a sectional bassinet which is divided transversely to provide three separate sections which are detachably connected together, said sections including a head section 3, a foot section 4, and an intermediate section indicated at 5. The bassinet has the usual supporting frame, shown generally at 6, from which the body 7 of the bassinet is suspended. The bassinet as a whole is divided transversely to provide the three separate sections above referred to; and for this purpose, each side of the frame 6 is divided into three sections including the head section 8, the foot section 9, and an intermediate section 10. The intermediate section 10 is shown as channel-shaped, and the free ends 11 of the two end sections 8 and 9 telescope into the ends of the channel section 10 and are secured thereto by some suitable means such as a screw 13 shown in Fig. 2. The body 7 of the bassinet is also divided transversely to provide the head section 14, the foot section 15, and an intermediate section 16. Said sections may be detachably connected together by a zipper construction indicated at 20. Each of the head and foot sections 3 and 4 of the bassinet is provided with a leg element 17 of any usual construction and which is formed with the two side sections 17b that are pivoted to the side portions of the corresponding end frame section as shown at 17c. The two side sections 17b of each leg 17 are connected at their lower ends by a transverse section 17a. Each of the head and foot bassinet sections 3 and 4 is also provided with a U-shaped handle member 18 that is pivoted to the side portions of the corresponding end frame section as shown at 21.

The head section 3 may be equipped with hook-shaped arms 56 by which it, when detached from the other sections 4 and 5, may be hung on the back of an automobile seat to provide a car seat for a child. Such arms are frequently made so that they can be removed from said head section.

The foot section 4 of the bassinet, when it has been separated from the other sections as shown in Fig. 6, can be combined with the vehicle frame presently to be described to produce a stroller, and the complete bassinet when combined with the vehicle frame produces a baby carriage.

The vehicle frame illustrated is provided with a main frame element 22 which is U-shaped in construction, and the free ends of the two legs 22a thereof are connected by an axle 23 on which is mounted two front wheels 24. Said vehicle frame also includes a U-shaped rear frame element 25 having the two side members 26 which are connected at their lower ends by a rear axle 27 on which is mounted the rear wheels 28. Each side member 26 of the rear frame is pivotally connected to the corresponding side of the main frame element 22, as shown at 29, and the upper end 30 of each side member 26 extends forwardly from its pivot point and constitutes a supporting portion 30 on which either the foot section 4 of the bassinet may be mounted when the vehicle is to be used as a stroller or the entire bassinet may be mounted when the vehicle is to be used as a baby carriage.

The sides of the vehicle frame element 22 and of the rear vehicle frame element 25 are connected together below the pivot point 29 by means of folding brace elements 31.

The foot section 4 of the bassinet shown in Fig. 5 carries two hanger elements 32, one on each side thereof. These hanger elements have an inverted U-shape, and one leg 33 of each hanger element has a head 34 which is riveted or otherwise rigidly secured to a side portion of the foot supporting frame section 9 as indicated at 35. Each hanger element is so mounted on a side portion of said supporting frame 9 that the bridge portion 36 thereof extends outwardly over said side portion and the other leg 37 thereof depends from the bridge portion and is spaced from the supporting frame section of said bassinet end section.

The supporting portion 30 of each side member 26 of the rear frame element of the vehicle frame has rigid therewith two ears 38 and 39 which extend inwardly therefrom and are located one above the other. These ears may conveniently be made from a strip of flat metal 40 which is bent into a U-shape and the bridge portion of which is riveted or otherwise rigidly secured to the supporting portion 30 of the rear vehicle frame element 25, as illustrated in Fig. 4.

Each of the ears 38 and 39 is provided with an aperture 42, said apertures being in vertical alignment. The vehicle frame is also provided with a shelf-like member 50 which is mounted on the lower ends of the legs 22a of the main frame element 22 as shown in Figs. 1 and 7. This shelf-like member might serve as a foot rest if the child occupying the stroller is large enough for this purpose, or it might be used as a rack to support small bundles or articles which have been acquired during a shopping trip. Said member 50 may be pivotally connected at 51 to the frame element 22 so that it can be folded when the vehicle frame is folded.

To convert the vehicle frame into a stroller, the foot section 4 of the bassinet is detached from the other sections and is mounted on the vehicle frame as shown in Fig. 1 with the arm 37 of each hanger element 32 inserted through the aligned openings 42 in the corresponding ears 38 and 39, thereby providing the seat element of the stroller. To assist in holding the seat element in its correct position, the vertical portions 17b of the leg element 17 may be detachably secured to the folding braces 31 of the vehicle frame, by means of a screw or bolt 45. To convert the vehicle frame into a baby carriage, the entire bassinet is mounted thereon as shown in Fig. 7, with the foot section 4 of the bassinet carried by the supporting portion 30 of the vehicle frame in the same way that said section 4 is when it is used as a stroller seat as shown in Fig. 1. The intermediate section 5 and the head section 3 of the bassinet will then extend forwardly over the front wheels 24, and said head section is supported by its leg element 17, the transverse portion of which is detachably secured to the shelf-like element 50 by means of a spring clip 52 which is carried on the front edge of said element. Any form of clip may be used, but the one shown has two forwardly extending spring fingers between which the transverse portion 17a of the leg element 17 may be held.

The vehicle frame by itself is not an expensive article to manufacture, and a person who has a sectional bassinet such as shown in Fig. 5 can provide herself with a complete stroller by simply separating the bassinet section 4 from the other sections of the bassinet and mounting said bassinet section on the vehicle frame as described above. When the bassinet section is thus mounted, the handle portion 18 which is pivoted to the bassinet section 4 may be swung down into a horizontal position shown in Fig. 1, thereby to provide a guard to hold a child in the stroller. The handle portion 18 is so shaped that when it is in its horizontal operative position shown in Fig. 1, it rests on and is supported by the projecting end portions 9 of the supporting frame section 9 for the bassinet section 4.

As stated above, the head section 3 of the bassinet is equipped with hook-shaped arms 56 by which said head section, when disconnected from the other sections, may be mounted on the back of an automobile seat thereby providing a child's car seat.

If so desired, these arms 56 may be removed when the bassinet is used to convert the vehicle into a baby carriage.

I claim:

1. A vehicle for transporting a small child having a vehicle frame comprising a U-shaped main frame element provided at its lower end with two front wheels, a rear frame element having two side members, each of which is pivotally connected at its upper end to the corresponding side of the main frame element at a point near the mid-section thereof, said rear frame element being provided with rear wheels and each side member thereof having at its upper end a substantially horizontal supporting portion extending forwardly from its pivotal connection with the main frame element and having a free end, a pair of spaced ears rigid with the horizontal supporting portion of each of said side members, the ears of each pair extending inwardly from the corresponding side member and also being in vertical alignment, each ear of each pair having an aperture in vertical alignment with that of the other ear of said pair, a child receiving element having a U-shaped supporting frame and a child supporting member carried thereby, means removably mounting the child receiving element on said pairs of ears, said means including an inverted U-shaped hanger for each side section of said U-shaped supporting frame, means rigidly securing one leg of each hanger to the corresponding side section of said supporting frame with the other leg of said hanger located outside of the supporting frame and in a position in which the other leg extends downwardly through the aligned apertures of the pair of ears on the corresponding portion of the U-shaped frame with the bridge of each U-shaped hanger resting on the top ear of the corresponding pair of ears.

2. In a convertible stroller and baby carriage, the combination with a vehicle frame comprising a U-shaped main frame element provided at its lower end with two front wheels, a rear frame element having two side members, each of which is pivotally connected at its upper end to the corresponding side of the main frame element at a point near the mid-section thereof, said rear frame element being provided with rear wheels and each side member thereof having at its upper end a substantially horizontal supporting portion extending forwardly from its pivotal connection with the main frame element, a pair of spaced ears rigid with the horizontal supporting portion of each of said side members, the ears of each pair extending inwardly from the corresponding side member and also being in vertical alignment, each ear of each pair having an aperture in vertical alignment with that of the other ear of said pair, of a sectional bassinet comprising three sections separable from each other and which include two end sections and an intermediate section, one of the end sections having a U-shaped supporting frame, an inverted U-shaped hanger for each side of said supporting frame, each hanger presenting two leg portions, means rigidly securing one leg portion of each hanger to the corresponding side section of said supporting frame with the other leg portion of the hanger extending downwardly on the outside of said supporting frame and adapted to be inserted through the aligned apertures in the corresponding pair of ears, whereby when the entire bassinet is mounted on the vehicle frame said frame will be converted into a baby carriage and when said one end section of the bassinet is detached from the other sections thereof and is mounted on the vehicle frame the latter is converted into a stroller.

3. A vehicle for transporting a small child which includes a U-shaped main frame element provided at its lower end with two front wheels, a rear frame element having two side members, each of which is pivotally connected at its upper end to the corresponding side of the main frame element at a point near the mid-section thereof, said rear frame element being provided with rear wheels and each side member thereof having at its upper end a substantially horizontal supporting portion extending forwardly from its pivotal connection with the main frame element, a bassinet, means adjacent one end thereof for detachably mounting said end on the horizontal supporting portions of the rear frame element, said means including a pair of horizontally extending ears mounted on the horizontal supporting portion of each side member, the ears of each pair being in vertical alignment and being directed inwardly, each ear of each pair having an aperture in vertical alignment with that in the other ear of said pair, an inverted U-shaped hanger at each side of the bassinet adjacent said end thereof, means rigidly securing one leg of each hanger to said bassinet with the closed end of the hanger extending beyond the bassinet and the other leg of the hanger spaced from the bassinet and extending downwardly through the apertures of the ears of one pair, and a brace element for supporting the other end of the bassinet and which is pivotally connected at its upper end to said other end of the bassinet and detachably connected at its lower end to the vehicle frame.

4. A vehicle of the stroller type for transporting a small child and which includes a U-shaped main frame element provided at its lower end with two front wheels, a rear frame element having two side members, each of which is pivotally connected at its upper end to the corresponding side of the main frame element at a point near the mid-section thereof, said rear frame element being provided with rear wheels and each side member thereof having at its upper end a substantially horizontal supporting portion extending forwardly from its pivotal connection with the main frame element, a pair of spaced ears rigid with the supporting portion of each of said side members, the ears of each pair extending inwardly from the corresponding side member and also being in vertical alignment, each ear of each pair having an aperture in vertical alignment with that of the other ear of said pair, a seat element removably mounted on said horizontal supporting portions of the rear vehicle frame element, said seat element having a U-shaped supporting frame and a seat member carried thereby, an inverted U-shaped hanger for each side section of said U-shaped supporting frame, means rigidly securing one leg of each hanger to the corresponding side section of said supporting frame with the other leg of said hanger located outside of said supporting frame and extending downwardly through the aligned apertures of the pair of ears on the corresponding horizontal supporting portion of the vehicle frame.

References Cited in the file of this patent

UNITED STATES PATENTS

| | | |
|---|---|---|
| 1,721,178 | Collier | July 16, 1929 |
| 1,722,757 | Levine | July 30, 1929 |
| 2,670,216 | Leonard | Feb. 23, 1954 |
| 2,730,163 | Goldberg | Jan. 10, 1956 |
| 2,777,706 | Welsh | Jan. 15, 1957 |
| 2,872,203 | Hedstrom | Feb. 3, 1959 |
| 2,873,123 | Eppinger | Feb. 10, 1959 |

FOREIGN PATENTS

| | | |
|---|---|---|
| 488,567 | Canada | Dec. 2, 1952 |
| 754,129 | Great Britain | Aug. 1, 1956 |